United States Patent [19]

Enns et al.

[11] Patent Number: 5,779,943
[45] Date of Patent: Jul. 14, 1998

[54] MOLDED POLYMERIC OBJECT WITH WETTABLE SURFACE MADE FROM LATENT-HYDROPHILIC MONOMERS

[75] Inventors: John B. Enns; Allan W. Kimble; Susan B. Orr; Douglas G. Vanderlaan. all of Jacksonville, Fla.

[73] Assignee: Johnson & Johnson Vision Products, Inc., Jacksonville, Fla.

[21] Appl. No.: 620,685

[22] Filed: Mar. 19, 1996

[51] Int. Cl.⁶ .................................................. B29D 11/00
[52] U.S. Cl. ........................ 264/1.7; 264/2.6; 264/1.38; 264/232; 264/340; 427/162
[58] Field of Search ................. 264/1.7, 2.6, 1.36, 264/1.38, 250, 232, 340; 427/162

[56] References Cited

U.S. PATENT DOCUMENTS

| | | | |
|---|---|---|---|
| 3,916,033 | 10/1975 | Merrill. | |
| 4,099,859 | 7/1978 | Merrill | 351/160 |
| 5,010,155 | 4/1991 | Mueller | 527/301 |
| 5,328,954 | 7/1994 | Sarangapani | 524/589 |
| 5,352,714 | 10/1994 | Lai et al. | 523/107 |

FOREIGN PATENT DOCUMENTS 362 137 A2  4/1990  European Pat. Off.

Primary Examiner—Mathieu D. Vargot

[57] ABSTRACT

This invention provides a molded polymeric object, partially or completely coated with a hydrophilic polymer which provides a wettable surface to the molded object such as a contact lens. It also provides a process for using latent-hydrophilic monomers to make molded objects with wettable surfaces.

28 Claims, No Drawings

MOLDED POLYMERIC OBJECT WITH WETTABLE SURFACE MADE FROM LATENT-HYDROPHILIC MONOMERS

BACKGROUND OF THE INVENTION

Contact lenses are widely used for vision correction because of their cosmetic and optical properties. Several health and comfort problems have been reported related to wettability and oxygen permeability of materials used to construct such contact lenses. Because the cornea is avascular, it obtains the oxygen it requires for normal metabolism directly from the air contacting it. It has long been known that the use of contact lenses reduces the amount of oxygen available to the cornea, and that this frequently causes corneal edema. Research has shown that the rate of healing of epithelial defects in rabbits is reduced under contact lenses due to the reduction in available oxygen. It has also been reported that the adhesion of *Pseudomonas aeruginosa* to rabbit corneas increases with decreasing oxygen permeability of contact lenses worn by the rabbits. It is believed that adhesion of bacteria, such as *Pseudomnonas aeruginosa*, to the corneal epithelium is the first step leading to bacterial keratitis, an infection that can result in permanent visual impairment.

Soft contact lenses are commonly made from hydrogel polymers, such as lightly crosslinked poly(hydroxyethyl methacrylate) (polyHEMA). The oxygen permeability of hydrogels is generally a function of their water content. The ultimate oxygen transmissibility of a contact lens is equal to its oxygen permeability divided by its thickness. With a water content of about 38% (mass of water/ mass of hydrated polymer), the oxygen permeability of polyHEMA hydrogels is too low to be used for contact lenses without substantial corneal edema, especially when lenses are worn in an extended wear mode, i.e. when they are worn continuously without removal for several days.

It is possible to make hydrogels with higher water contents, and hence higher oxygen permeabilities, by including more highly hydrophilic monomers such as methacrylic acid or N-vinylpyrrolidone; however, such high water content hydrogels typically have poor mechanical strength, and so very thin contact lenses made from them are difficult to handle, or tear easily. Thin contact lenses made from high water content hydrogels have also been found to cause irritation to the outer epithelial surface of the cornea.

To overcome the oxygen permeability limitations of hydrogel contact lenses, silicone and other hydrophobic polymers such as polyfluorinated polymers and polypropylene glycol have been employed as contact lens materials. The oxygen permeability of such materials can be very high; however, the surfaces of such materials typically have very poor wettability. Furthermore the surfaces of such polymers typically have an affinity for certain tear components such as proteins, lipids and mucin. Such unsatisfactory surface characteristics cause lenses made from these materials to quickly become fouled with opaque deposits when worn. Such lenses can also be very uncomfortable, and may have a tendency to become tightly adhered to the cornea, potentially leading to serious damage of the corneal epithelium.

One potential approach to making contact lenses with the above mentioned highly oxygen permeable low water content polymers is to form a coating of a hydrophilic polymer on the surface of a lens made from such a highly oxygen permeable, low water content polymer. U.S. Pat. Nos. 3,916, 033 and 4,099,859 to E. Merrill disclose coating preformed silicone contact lenses with hydrophilic polymers. Merrill also discloses forming silicone lenses while transferring a hydrophilic monomer from a cellophane film which had been treated with the hydrophilic monomer and then laid onto the mold surface. The process described therein is cumbersome and difficult to control, and requires very high energy doses of potentially hazardous ionizing radiation.

EP Patent No. 362,137 and U.S. Pat. No. 5,010,155 to Mueller disclose a process of forming a contact lens from a hydrophobic polymer with a hydrophilic polymeric surface. The process described is difficult to conduct since the polymer which forms the coating may either have insufficient hydrophilicity to make the surface of the lens very wettable, or because it is generally difficult to form a coating of a hydrophilic polymer on the internal surface of a contact lens mold as the process requires, especially if the mold is made from a plastic such as polypropylene or polystyrene.

A number of efforts have been made to increase the surface wettability of high oxygen permeability hydrophobic materials by incorporating hydrophilic components into them; however, increases in surface wettability resulting from bulk polymer modification are generally accompanied by substantial loss of oxygen permeability. For example, U.S. Pat. 5,321,108 to J. Kunzler and R. Ozark describes novel fluorosiloxane-containing monomers for use in contact lenses. However, when hydrophilic monomers such as dimethylacrylamide (DMA) were added in order to make the polymer more hydrophilic the oxygen permeability (Dk) dropped from 530 to as low as 52. U.S. Pat. No. 5,336,797 to J. McGee and P. Valint discloses that when a hydrophilic monomer such as DMA is added to a blend of siloxane monomers, the Dk falls from 238–353 to 62–187. Another approach to imparting the desired hydrophilicity to hydrophobic siloxane polymers is described in U.S. Pat. No. 4,259,467 to P. Koegh, J. Kunzler and G. Niu. Polymerizable polysiloxanes with hydrophilic side chains were synthesized and used to make contact lenses. Alternatively, U.S. Pat. No. 5,070,169 to J. Robertson, K. Su, M. Goldenberg and K. Mueller describes contact lenses made from block copolymers of polysiloxanes with hydrophilic units such as polyethylene glycol. All of these approaches have failed to give sufficiently wettable surfaces, or the desired high Dk.

Attempts have also been made to overcome the problem of the poor wettability of hydrophobic contact lens polymers by conducting chemical reactions on the surface of such polymers to modify these surfaces and make them wettable. For example, EP 379,146 assigned to Menicon Co. describes soft contact lenses made from copolymers of polysiloxane, alkyl (meth)acrylate and fluorine-containing monomers. Examples are given of the application of an alkali treatment to these lenses in order to impart a hydrophilic nature to their surfaces. Such a treatment is difficult to control so that the desired effect is imparted to the lens surface without leaving the surface still hydrophobic, or without degrading the bulk of the contact lens.

BRIEF SUMMARY OF THE INVENTION

This invention relates to an article of manufacture, e.g. a contact lens made with a body of bulk polymer having oxygen-permeability and coated with a latent-hydrophilic polymer, and to a process for preparing that article including the steps:

(a) applying a normally hydrophobic/latent-hydrophilic polymerizable material to the inner surfaces of a mold for making the article of manufacture;

(b) filling the coated mold with a monomeric material which is polymerizable to an oxygen-permeable polymeric material;

(c) curing the mold contents to produce a coated article of manufacture, e.g. a contact lens; and (d) treating the coated molded article to mild reaction conditions to convert the coating to a more hydrophilic form.

DETAILED DESCRIPTION OF THE INVENTION

This invention provides a molded polymeric object, partially or completely coated with a hydrophilic polymeric material which provides a wettable surface to the molded object. It also provides a process for using latent-hydrophilic materials made from monomers that normally produce hydrophobic polymers to make molded objects with wettable surfaces.

In this process a latent-hydrophilic polymerizable material, i.e. a monomer, a mixture of monomers, or a prepolymer containing one or more latent-hydrophilic polymerizable materials is used to coat all or part of the inner surfaces of a contact lens mold. Latent-hydrophilic materials are selected from a group of materials with functional groups which can be chemically converted under mild conditions into hydrophilic functional groups, preferably ionic groups. The use of such materials generates coatings that have reduced water contact angles upon conversion to their hydrophilic forms. An example of such a monomer is (3-aminopropylmethacrylamide-N,N-diacetic acid diethyl ester) identified as F-85.

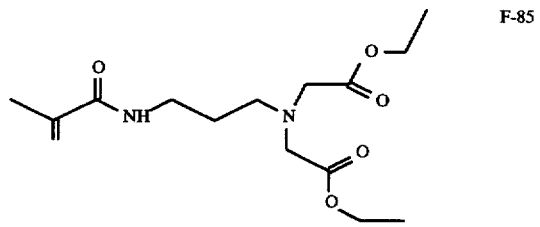

After polymerization, the amine group can be converted into a hydrophilic, ionic ammonium salt by immersion into a neutral or mildly acidic aqueous environment. The ethyl ester functional groups can be converted into hydrophilic, ionic carboxylate groups by a hydrolysis reaction:

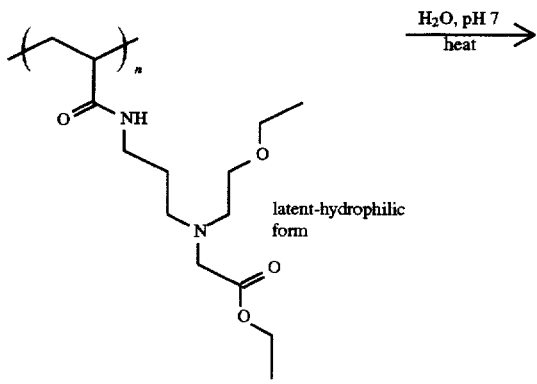

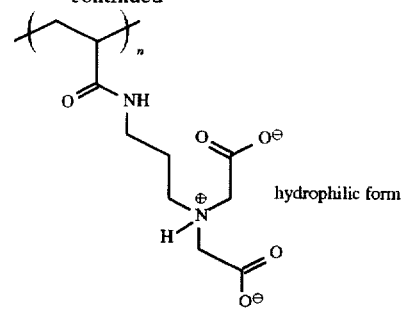

Because of the neighboring group effect of the amino group, this hydrolysis proceeds easily by heating in buffered neutral water.

The advantage of this invention over prior art is that the application of the monomer to the mold surface in a hydrophobic, latent-hydrophilic form allows it to easily form a uniform thin film on a relatively hydrophobic mold surface. Since the molds used to make contact lenses are generally made from relatively hydrophobic polymers, such as polystyrene or polypropylene, it is very difficult to form a smooth, continuous, thin film of a hydrophilic monomer such as HEMA to the mold surface, because such hydrophilic monomers tend to bead up or retract from the mold surface. The application of hydrophobic monomers to a hydrophobic base allows a smooth, continuous, thin monomer film to be formed. For example, the use of a typical, relatively hydrophobic monomer such as methyl methacrylate or lauryl methacrylate will allow a thin film to be formed on the mold surface, but will generally result in a contact lens with a hydrophobic, non-wettable surface. The use of a hydrophobic latent-hydrophilic monomer allows the formation of a smooth continuous film of the monomer on the mold surface, and then allows the resulting relatively hydrophobic lens coating to be converted under mild conditions into a relatively hydrophilic, wettable lens coating.

The latent-hydrophilic monomers that can be used in this invention include, as non-limiting examples, monomers with a polymerizable functional group such as methacrylate, acrylate, styryl, or vinyl groups, and a non-ionic functional group which can be converted into an ionic functional group by mild chemical reaction conditions. These mild reaction conditions are intended to be contrasted to harsh or strong reaction conditions such as the use of a strong acid or alkaline conditions above pH 9 or below pH 5. Examples of suitable functional groups are amino groups, which can be converted into ammonium groups by immersion in neutral or mildly acidic aqueous solutions; esters of α-amino acid esters, which can be converted into ionic carboxylate groups under mild hydrolytic conditions; as well as acid chloride and acid anhydride functional groups, which can also be converted into ionic carboxylate groups under mild hydrolytic conditions; and carboxylic acid functional groups, which can be converted into carboxylate groups by immersion in neutral or mildly alkaline aqueous solutions. Thus specific but not limiting examples of monomers that can be used in this invention, either singly or in combination, include but are not limited to F-85 as well as the dimethyl, di-n-propyl, diisopropyl, dibutyl, dibenzyl and diphenyl esters of 3-aminopropylmethacrylamide-N,N-diacetic acid; methacrylic acid; acrylic acid; itaconic acid; methacrylic anhydride; acrylic anhydride; maleic anhydride; methacryloyl chloride; acryloyl chloride; aminopropyl methacrylamide; and 2-dimethylaminoethyl methacrylate.

Cross-linking monomers can also be included in the monomer blend used to coat the mold surfaces, either singly or in combination, including ethylene glycol dimethacrylate (EGDMA).

A polymerization catalyst can be included in either or both monomer mixtures. The polymerization catalyst can be a compound such as lauroyl peroxide, benzoyl peroxide, isopropyl percarbonate, azobisisobutyronitrile, or the like, that generates free radicals at moderately elevated temperatures, or the polymerization catalyst can be a photoinitiator system such as an aromatic α-hydroxy ketone or a tertiary amine plus a diketone. Illustrative examples of photoinitiator systems are 2-hydroxy-2-methyl-1-phenyl-propan-1-one and a combination of camphorquinone and ethyl 4-(N,N-dimethylamino)-benzoate. The catalyst can be used in the coating mixture in catalytically effective amounts, e.g., from about 0.1 to about 2.0 parts per weight per 100 parts coating monomer mix.

The coating monomer mix can also include conventional reactive monomers such as HEMA, N,N-dimethylacrylamide, methyl methacrylate and N-vinylpyrrolidone.

The coating monomer mix may also include a volatile or non-volatile nonreactive carrier or surfactant to aid in application, for instance by reducing the viscosity of the mix or by further improving the wetting of the coating monomer mix on the mold surface. These may include but are not limited to ethanol, methanol, isopropanol, polypropylene glycol, polytetramethylene glycol, and polyoxyethylene sorbitan monolaurate.

It may also be advantageous to partially polymerize a fraction of the latent-hydrophilic monomer to produce a prepolymer before application to the mold surface in order to increase the viscosity of the monomer mix and thereby improve the stability of the film formed on the mold surface.

Contact lens molds for use in this invention include, but are not limited to, polypropylene, polyethylene, metal, ceramic, or polystyrene.

The latent-hydrophilic monomer mix may be applied to the inner surface of the mold by any of several coating methods known to those skilled in the art, including but not limited to, spraying, transfer printing, dipping, or brushing. When a volatile nonreactive carrier such as isopropanol is used, the nonreactive carrier may be allowed to evaporate before filling the mold with the monomer mix which will form the lens. The coating monomer mix may be cured either by heating or by irradiation with UV light, or the mold may be used without pre-curing the coating, thus allowing the coating and the bulk lens polymer to cure simultaneously.

Wettability of a solid surface is determined by immersing a sample in a probe liquid. Advancing angles and receding angles are obtained when the sample is immersed into the liquid and withdrawn from the liquid, respectively. These angles will vary in this invention depending on the chemical structure of the latent-hydrophilic coating on the lens after the coating has been converted to its hydrophilic form. As seen in Examples 1–10 these angles may vary typically from 68°–115° for the advancing angle. These are compared with the same measurement on lenses of the same composition, but without the coating of a latent-hydrophilic monomer. These measured angles may vary typically from 128°–130° for the advancing angle. Of course, the higher the numerical value of the angle the less is the wettability.

The polymer for the bulk of the contact lens may be selected from a group of relatively hydrophobic polymers including, but not limited to, crosslinked polydimethylsiloxanes, polyfluorinatedalkyl-functional polymers, or polypropylene glycols. These polymers may be formed either by condensation polymerization reactions such as isocyanate-alcohol reactions, silanol coupling reactions or by polyvinyl polymerizations, which may be initiated with heat, visible light or UV light, depending upon the cure catalyst selected. One preferred monomer for use in this application is α,ω-bismethacryloxypropyl polydimethylsiloxane:

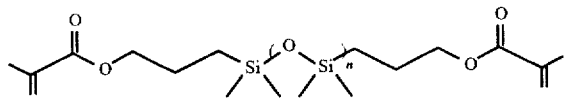

in which n is equal to 20–500, preferably about 300.

Other reactive polydimethylsiloxane monomers as well as fluorosiloxane-containing monomers and block copolymers containing polysiloxane and polyalkylene oxide blocks can also be used to form the bulk lens polymer.

After the coated lenses are formed by polymerization of the bulk monomer mixture and the latent-hydrophilic coating in the mold, the lenses are removed from the mold and exposed to mild reaction conditions sufficient to convert the latent-hydrophilic functional groups on the surface of the lenses into their hydrophilic forms. When the latent-hydrophilic functional groups used are simple acidic or basic groups such as carboxylic acid or amine functional groups, it is generally sufficient to immerse the lenses for a period of time in an aqueous solution which causes an acid-base reaction of that group, and converts it to a hydrophilic ionic form. Since the environment of the eye has a pH of approximately 7.3, it is preferred to immerse the lens in a pH neutral aqueous salt solution such as a phosphate or borate-buffered saline, typically for 10 to 100 minutes, before use. If the latent-hydrophilic monomers are acid anhydride-functional or acid chloride-functional monomers, the immersion of the lens in water for 1 to 20 hours either at room temperature or with heating, is generally required to convert the coating to its ionic, hydrophilic form. With the preferred monomers for this process, α-amino carboxylic acid esters such as F-85, heating the lens in neutral buffered saline at temperatures of about 80° to 130° C. for about 1 to 20 hours is generally sufficient to convert the coating to its ionic, hydrophilic form. A lens coating made from amino-functional monomers can also be converted to an ionic form by reaction with ethyl bromoacetate or ethyl chloroacetate followed by hydrolysis of the resulting α-amino ester groups to produce hydrophilic, ionic carboxylate groups, or a lens coating made from amino-functional functional monomers can be reacted with a haloacetic acid such as α-bromoacetic acid or α-chloroacetic acid to form hydrophilic, ionic carboxylate groups directly.

The preferred α-amino carboxylic acid ester-functional monomers such as F-85 can be prepared by reacting primary or secondary amine-functional reactive monomers with α-chloro or bromo acetic acid esters. For example, when APMA (3-aminopropyl-methacrylamide) is reacted with two moles of ethyl bromoacetate in the presence of a base such as sodium carbonate, F-85, a tertiary amino dicarboxylic acid diester is produced:

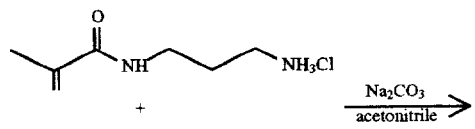

7

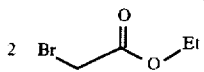

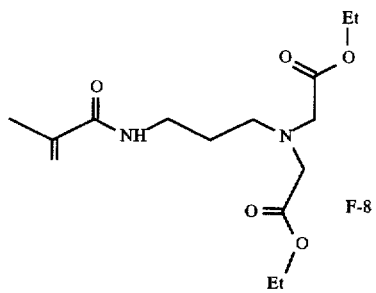

EXAMPLE 1

- Preparation of silicone lenses coated with poly (F85)

2.01 g (11.3 mmole) APMA.HCl, 3.73 ml (5.62 g, 33.7 mmole) ethyl bromoacetate and 3.56 g (33.6 mmole) $Na_2CO_3$ were combined in 122 g acetonitrile and stirred at room temperature for 24 hours. The reaction mixture was filtered, a small crystal of hydroquinone monomethyl ether (HQMME, inhibitor) was added to the filtrate, and the solvent was evaporated under reduced pressure to give an orange liquid. Aqueous 4% HCl was added until the mixture was acidic. This solution was extracted once with $CH_2Cl_2$, made alkaline with saturated $Na_2CO_3$, and extracted again with fresh $CH_2Cl_2$. The $CH_2Cl_2$ layer was dried over solid $Na_2SO_4$, inhibited with a small crystal of HQMME, and rotovapped to give 1.64 g of product, F-85, as an oil which gave the following analytical results: $^1H$ NMR ($CDCl_3$) 1.22 ppm (t,6H), 1.61 (m 2H), 1.92 (s, 3H), 2.71 (t, 2H), 3.41 (t, 2H), 3.44 (s, 4H), 4.12 (q, 4H), 5.25 (m, 1H), 5.71 (m, 1H), 7.39 (br s, 1H); IR (neat) 3354, 2980, 2938, 2870, 1737, 1661, 1619, 1619, 1531, 1196, 1029 $cm^{-1}$. An HPLC of the product showed a single major peak, with no residual APMA or ethyl bromoacetate detected.

2.0 parts of F-85 were dissolved in 8.0 parts of isopropyl alcohol and 0.02 parts of α-hydroxy-α,α-dimethylacetophenone. This blend was applied with a sponge-tipped swab in a thin film to all inner surfaces of polystyrene contact lens molds. After the isopropyl alcohol had evaporated, a blend of 99 parts of a silicone monomer with the following chemical structure,

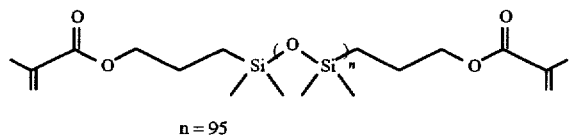

n = 95 and 1 part 1-hydroxy-cyclohexylphenyl ketone was placed into these coated polystyrene contact lens molds. The molds were closed and irradiated with UV light (Philips fluorescent bulbs, 129 mJ/cm$^2$*min) for 0.5 hour. The resulting contact lenses were removed from the molds, soaked for 1 hour in isopropyl alcohol, then 1 hour in ethyl acetate, rinsed in borate buffered saline solution, and then heated in an autoclave in borate buffered saline solution for 7 hours at 121° C. to hydrolyze the ethyl ester functional groups. The advancing angle of borate buffered saline on this lens is 71 degrees, compared to 128 for lenses made by the same process, but without the coating.

EXAMPLE 2

- Preparation of contact lenses coated with poly (methacrylic acid)

A blend, made by combining 15.58 grams poly (propylene) glycol (4000 M.W.) with 4.60 grams methacrylic acid, 0.06 gram α-hydroxy-α,α-dimethylacetophenone and 0.05 gram EGDMA, was applied with a sponge tipped swab in a thin film to all inner surfaces of polystyrene contact lens molds. A blend of 99 parts of bis-methacryloxypropyl-silicone monomer and 1 part 1-hydroxycyclohexylphenyl ketone was placed into these coated polystyrene contact lens molds. The molds were closed and irradiated with UV light (Philips fluorescent bulbs, 129 mJ/cm$^2$*min) for 0.5 hours. The resulting contact lenses were removed from the molds, soaked for 1 hour in isopropyl alcohol, then 1 hour in ethyl acetate, rinsed in borate buffered saline solution, and immersed in borate buffered pH 7 physiological saline. The surfaces of the resulting lenses were more wettable than lenses made from the silicone monomer without the surface treatment.

EXAMPLE 3

- Preparation of silicone lenses coated with 3-aminopropylmethacrylamide - N,N - diacetic acid di-n-propyl ester 3-Aminopropylmethacrylamide - N,N - diacetic acid di-n-propyl ester was prepared from 3-aminopropylmethacrylamide and n-propyl bromoacetate following the procedure of EXAMPLE 1. The product was isolated as an oil and gave the following analytical results: $^1H$ NMR ($CDCl_3$) 0.94 ppm (t, 6H), 1.67 (m, 6H), 1.97 (s, 3H), 2.77 (t, 2H), 3.47 (t, 2H), 3.51 (s, 4H), 4.07 (t, 4H), 5.30 (m, 1H), 5.76 (m, 1H), 7.40 (br s, 1H).

Polystyrene contact lens molds were coated using a solution of 0.113 grams of the above oil, 0.09 grams isopropyl alcohol and 0.02 grams α-hydroxy-α,α-dimethylacetophenone. Lenses were then made using the procedure of EXAMPLE 1. The advancing angle of borate buffered saline on this lens is 95 degrees.

EXAMPLE 4

- Preparation of silicone lenses coated with 3-aminopropylmethacrylamide - N,N - diacetic acid di-iso-propyl ester 3-Aminopropylmethacrylamide - N,N - diacetic acid di-isopropyl ester was prepared from 3-aminopropylmethacrylamide and iso-propyl bromoacetate following the procedure of EXAMPLE 1. The product was isolated as an oil and gave the following analytical results: $^1H$ NMR ($CDCl_3$) 1.24 ppm (d, 12H), 1.65 (m, 2H), 1.97 (s, 3H), 2.76 (t, 2H), 3.46 (s, 4H), 3.49 (t, 2H), 5.04 (sep, 2H), 5.29 (m, 1H), 5.76 (m, 1H), 7.48 (br s, 1H).

Polystyrene contact lens molds were coated using a solution of 0.36 grams of the above oil, 0.23 grams isopropyl alcohol and 0.02 grams α-hydroxy-α, α-dimethylaceophenone. Lenses were then made using the procedure of EXAMPLE 1. The advancing angle of borate buffered saline on this lens is 99 degrees.

EXAMPLE 5

- Preparation of silicone lenses coated with methacrylic anhydride

A blend of 0.01 grams α-hydroxy-α,α-diemthylacetophenone and 1.03 grams of methacrylic anhydride was applied in a thin film to the inside surfaces of a polystyrene contact lens mold. The mold was filled with a blend of silicone monomer and photoinitiator as described in EXAMPLE 1, and lenses were formed by UV initiated polymerization. These lenses were removed from the molds, washed with ethyl acetate, and heated for 7 hours at 121° C. in borate buffered saline solution. The advancing angle of borate buffered saline on this lens is 106 degrees.

EXAMPLE 6

- Preparation of F-85 coated lenses using polypr opylene molds

Polypropylene contact lens molds were coated using a solution of 4 parts of F-85, 6 parts isopropyl alcohol and 0.03 parts α-hydroxy-α, α-dimethylacetophenone. Lenses were made using the procedure of EXAMPLE 1. The advancing angle of borate buffered saline on this lens is 41 degrees.

EXAMPLE 7

- Preparation of F-85 coated silicone lenses made without photoinitiator in the coating Polystyrene contact lens molds were coated using a solution of 2.0 parts of F-85 and 8.0 parts isopropyl alcohol. Lenses were then made using the procedure of EXAMPLE 1. The advancing angle of borate buffered saline on this lens is 89 degrees.

EXAMPLE 8

- Preparation of F-85 coated silicone lenses made with a cross-linker added to the coating Polystyrene contact lens molds were coated using a solution of 0.2 grams of F-85, 0.0033 grams ethyleneglycol dimethacrylate and 0.8 grams isopropyl alcohol. Lenses were then made using the procedure of EXAMPLE 1. The advancing angle of borate buffered saline on this lens is 68 degrees.

EXAMPLE 9

- Preparation of silicone lenses coated with partially pre-polymerized F-85

A blend of 20% F-85 and 1% α-hydroxy-α, α-dimethylacetophenone in isopropyl alcohol was irradiated with UV light for 4 hours. Polystyrene molds were coated with this blend and lenses were made following the procedure of EXAMPLE 1. The advancing angle of borate buffered saline on this lens is 115 degrees.

EXAMPLE 10

Preparation of polypropylene glycol lenses coated with partially pre-polymerized F-85

The procedure of EXAMPLE 9 was repeated except using polypropylene glycol (MW 4000) reacted at the terminal hydroxyl groups with isocyanatoethyl methacrylate in place of the silicone. The advancing angle of borate buffered saline on this lens is 89 degrees, compared to 130 degrees an uncoated lens made from the same bulk polymer.

What is claimed is:

1. A process for preparing the molded article of manufacture comprising a body of a bulk polymer coated with a latent-hydrophilic polymerizable material, (a) coating an inner surface of a mold with a latent-hydrophilic, normally hydrophobic polymerizable material;

(b) filling the coated mold of step (a) with a monomeric material which is polymerizable to an oxygen-permeable polymeric material;

(c) curing the mold contents of step (b) to produce a coated molded object; and (d) treating said coated molded object of step (c) with a solution having a pH from 5 to 9 to convert the coating to a hydrophilic form.

2. The process of claim 1 in which the latent hydrophilic polymerizable material is a carboxylic acid ester of α-amino acid.

3. The process of claim 1 in which step (d) includes heating said object in a buffered neutral aqueous solution for 1–20 hours at 20° to 130° C.

4. The process of claim 1 in which the latent hydrophilic polymerizable material is 3-aminopropyl-methacrylamide-N,N-diacetic acid diethyl ester.

5. The process of claim 1 in which the latent-hydrophilic polymerizable material is methacrylic acid.

6. The process of claim 1 in which step (a) includes a carrier added to the latent-hydrophilic polymerizable material.

7. The process of claim 6 in which said carrier is isopropyl alcohol.

8. The process of claim 6 in which said carrier is a glycol.

9. The process of claim 1 in which step (c) is accomplished in the presence of a UV polymerization initiator.

10. The process of claim 1 in which the mold is made of polypropylene.

11. The process of claim 1 in which said oxygen-permeable polymeric material is α,ω-bismethacryloxyalkyl polydimethylsiloxane.

12. The process of claim 1 in which said oxygen-permeable polymeric material is polypropylene glycol.

13. The process of claim 1 in which the monomeric material of step (b) is a polyfluorinated alkyl-functional monomer.

14. The process of claim 1 wherein the coating of step (a) is accomplished by spraying said latent-hydrophilic polymerizable material onto the mold.

15. The process of claim 1 wherein the coating of step (a) is accomplished by dipping the mold into the latent-hydrophilic polymerizable material.

16. The process of claim 1 wherein the coating of step (a) is accomplished by brushing the latent-hydrophilic polymerizable material into the mold.

17. The process of claim 1 wherein said latent-hydrophilic polymerizable material is a prepolymer.

18. The process of claim 1 wherein the molded article of manufacture is a contact lens.

19. The process of claim 1, wherein said latent-hydrophilic polymerizable material contains a functional group which is chemically convertible to a more hydrophilic functional group.

20. The process of claim 1, wherein said monomeric material of step (b) comprises polydimethylsiloxane.

21. The process of claim 1, wherein said latent-hydrophilic polymerizable material comprises diester of 3-aminopropylmethacrylamide-N,N-diacetic acid.

22. The process of claim 1, wherein said treating step (d) further comprises immersing said object in a neutral, mildly acidic, or mildly alkaline aqueous solution.

23. The process of claim 1 in which said latent-hydrophilic polymerizable material comprises polymerizable functional groups selected from the group consisting of amino groups, esters of α-amino acid esters, acid chloride and acid anhydride functional groups, and carboxylic acid functional groups.

24. The process of claim 1 in which said latent-hydrophilic polymerizable material is selected from the group consisting of the diethyl, dimethyl, di-n-propyl, diisopropyl, dibutyl, dibenzyl and diphenyl esters of 3-aminopropylmethacrylamide-N,N-diacetic acid; methacrylic acid; acrylic acid; itaconic acid; methacrylic anhydride; acrylic anhydride; maleic anhydride; methacryloyl chloride; acryloyl chloride; aminopropyl methacrylamide; carboxylic acid ester of α-amino acid, and 2-dimethylaminoethyl methacrylate.

25. The process of claim 1 in which said treating step (d) further comprises heating said object in a buffered neutral aqueous solution.

26. The process of claim 1 in which said treating step (d) further comprises heating said solution.

27. The process of claim 1 in which said treating step (d) further comprises mild hydrolytic conditions.

28. The process of claim 1 in which said latent-hydrophilic polymerizable material comprises functional groups selected from the group consisting of amino groups, which when treated according to step (d) by immersion in neutral or mildly acidic aqueous solutions are converted into ammonium groups; esters of α-amino acid esters, which when treated according to step (d) under mild hydrolytic conditions can be converted into ionic carboxylate groups; acid chloride and acid anhydride functional groups, which when treated according to step (d) under mild hydrolytic conditions can be converted into ionic carboxylate groups; and carboxylic acid functional groups, which when treated according to step(d) by immersion in neutral or mildly alkaline aqueous solutions can be converted into carboxylate groups.

* * * * *

UNITED STATES PATENT AND TRADEMARK OFFICE
CERTIFICATE OF CORRECTION

PATENT NO. : 5,779,943
DATED : Jul. 14, 1998
INVENTOR(S) : Enns et al.

It is certified that error appears in the above-indentified patent and that said Letters Patent is hereby corrected as shown below:

In claim 1, column 9, line 64, kindly delete ")" and insert after material --which comprises the steps of:--

In claim 3, column 10, line 12, kindly insert after which --the reaction conditions of--

Signed and Sealed this

Fourth Day of January, 2000

Attest:

Attesting Officer

Acting Commissioner of Patents and Trademarks